United States Patent [19]

Bailey

[11] 4,010,408

[45] Mar. 1, 1977

[54] SWITCH MECHANISM FOR DOOR OPERATOR

[75] Inventor: Morris W. Bailey, Fort Worth, Tex.

[73] Assignee: Overhead Door Corporation, Dallas, Tex.

[22] Filed: Mar. 13, 1975

[21] Appl. No.: 557,929

[52] U.S. Cl. .................... 318/266

[51] Int. Cl.[2] .................... H02P 1/42

[58] Field of Search .......... 318/265, 266, 267, 467, 318/468, 466

[56] References Cited

UNITED STATES PATENTS

| | | | |
|---|---|---|---|
| 3,164,761 | 1/1965 | Richmond | 318/266 |
| 3,474,317 | 10/1969 | Delaney | 318/266 |
| 3,764,874 | 10/1973 | Geoffrey | 318/266 |
| 3,764,875 | 10/1973 | Harris | 318/266 |
| 3,813,590 | 5/1974 | Ellmore | 318/266 |

*Primary Examiner*—Robert K. Schaefer

*Assistant Examiner*—W. E. Duncanson, Jr.

*Attorney, Agent, or Firm*—Woodhams, Blanchard and Flynn

[57] ABSTRACT

An operator for an upwardly acting door. A reversible electric motor is drivingly connected to the door by an intermediate drive linkage. A switch assembly is associated with the operator for controlling the upward and downward movement of the door, which switch assembly includes first and second limit switches for deactivating the motor when the door reaches its lowermost and uppermost positions, respectively. A third switch functions as a safety switch for causing reversal in the motor rotation when the driving force exceeds a preselected maximum. Fourth and fifth cut-off switches are respectively positioned adjacent the first and second switches for overriding the third switch when the door is within a preselected distance from its closed or open position. The limit and cut-off switches are controlled by a rotatable screw member having a pair of traveling nuts thereon which coact with a pair of individually movable control slides. One of the control slides activates the first and fourth switches, and the other control slide activates the second and fifth switches.

17 Claims, 11 Drawing Figures

SWITCH MECHANISM FOR DOOR OPERATOR

FIELD OF THE INVENTION

This invention relates to a motorized operator for opening and closing an upwardly acting door and, in particular, to an operator having an improved switch mechanism associated therewith to permit optimum control over the door movement.

BACKGROUND OF THE INVENTION

Persons acquainted with the operation of upwardly acting doors having an electrical operator for effecting door movement are aware that some door operators have a safety switch whereby the direction of door movement is automatically reversed if the door engages an obstruction during movement in its downward or closing direction. This safety feature, as disclosed in U.S. Pat. No. 3,474,317 owned by the assignee of this application, has been provided to prevent damage to equipment and injury to personnel which might result from continued operation of the door. While operators of this type have been commercially acceptable, nevertheless they do possess structural and operational features which have been undesirable either from a cost, maintenance or operational viewpoint.

To improve upon operators of this type, U.S. Pat. No. 3,764,875 discloses an operator having a mechanical override system for deactivating the safety switch when the door is within a preselected distance from either its fully opened or fully closed position to prevent reversal of the door movement. While the operator of this patent does possess the ability to deactivate the safety switch, nevertheless this operator is structurally complex and does not possess the degree of flexibility necessary to provide for optimum control over all of the door movements.

Accordingly, the objects and purposes of the invention have been met by providing a motorized door operator having improved switch mechanism and circuitry capable of overcoming the problems and achieving the results set forth above.

A further object of the invention is the provision of a door operator, as aforesaid, which represents a substantial improvement, both structurally and operationally, over the operators disclosed in the patents mentioned above.

A still further object of the invention is the provision of a door operator, as aforesaid, which is fool proof in operation, simple in construction, can be adapted to existing door operating mechanisms, and does not interfere with the normal manual or remote control conventionally utilized for energizing the electrical system.

Still a further object of the invention is the provision of a door operator, as aforesaid, which possesses (1) a reversing safety switch for automatically causing upward movement of the door when the door strikes an obstruction during the downward movement thereof, (2) up and down limit switches for deactivating the operator when the door respectively reaches its fully opened and fully closed positions, and (3) up and down cut-off switches for overriding the safety switch when the door is within a preselected distance from its respective fully opened and fully closed position.

Another object of the invention is the provision of a door operator, as aforesaid, which incorporates a slide assembly within the switch mechanism for controlling the limit and cut-off switches in a simple yet reliable manner.

Other objects and purposes of this invention will be apparent to persons familiar with this type of equipment upon reading the following specification and inspecting the accompanying drawings.

Figures 1, 3:
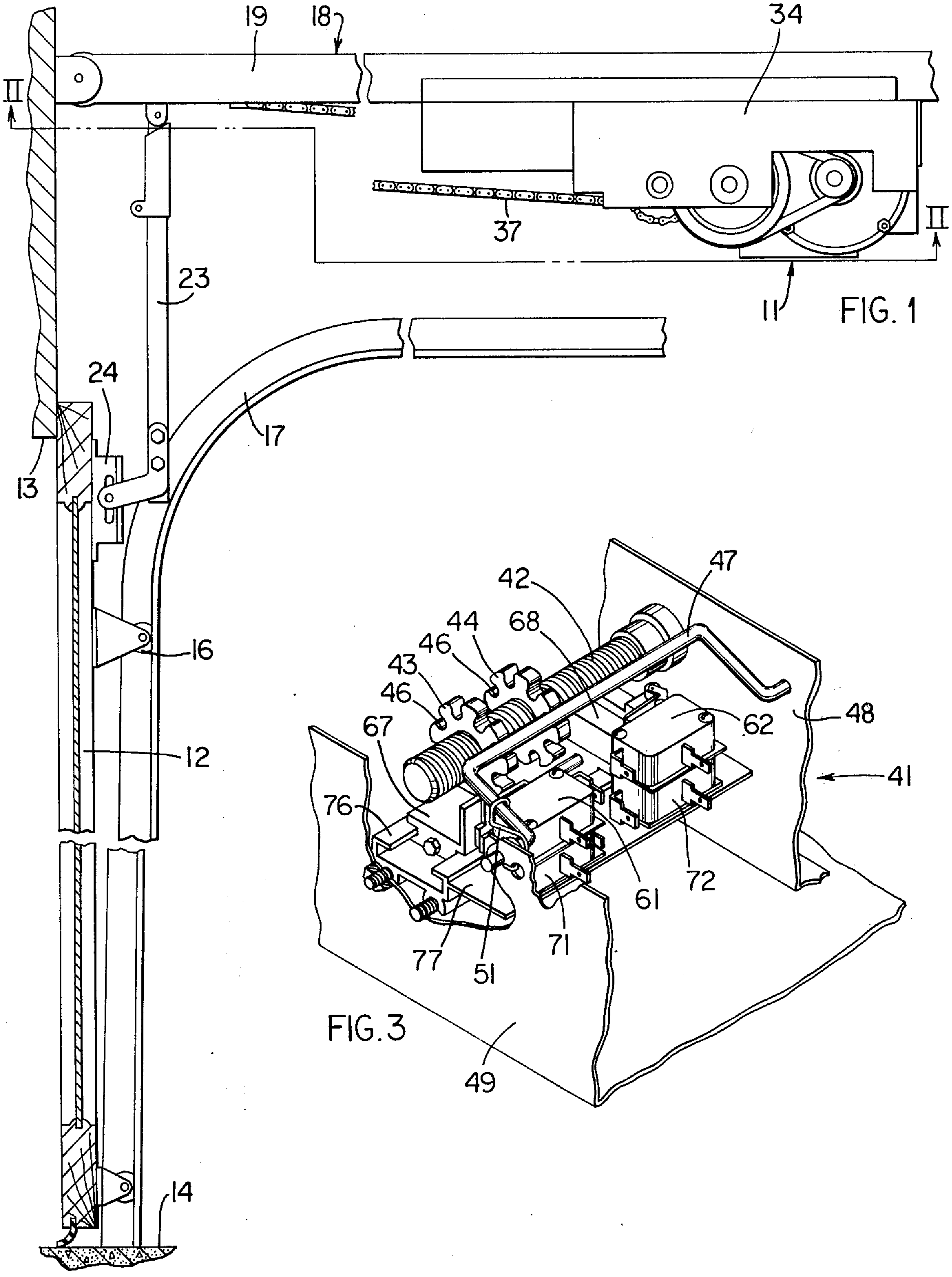
FIG. 1 is a broken, elevational view of an upwardly acting door in combination with a motorized door operator embodying the switch mechanism and circuitry of the present invention.
FIG. 3 is a fragmentary view of the switch mechanism according to the present invention.

For convenience in description, the terms "upper", "lower", "leftward" and "rightward" will have reference to directions as appearing in the drawings. The word "front" and "rear" will be used to designate the structure appearing on the left and right sides, respectively, of FIG. 1. The words "inwardly" and "outwardly" will refer to directions toward and away from, respectively, the geometric center of the apparatus and designated parts thereof. Said terminology will include the words above specifically mentioned, derivatives thereof, and words of similar import.

SUMMARY OF THE INVENTION

The objects and purposes of the present invention have been met by providing an operator which includes a reversible electrical motor drivingly connected to the door by an intermediate power transmitting device. A safety switch coacts with the power transmitting device for causing reversal in the rotational direction of the motor during downward movement of the door when the driving force exceeds a preselected maximum. A switch mechanism is associated with the operator and includes a control member in the form of a rotatable screw having first and second nuts mounted thereon. The first nut which controls the door when adjacent its closed position, coacts with a first slide which is adjacent the screw and is slidable relative thereto, whereupon the nut contacts the first slide and causes movement thereof only when the door approaches its closed position. The second nut coacts with a second slide which is slidably disposed adjacent the screw and is also slidable with respect to the first slide. The second nut and second slide have a limited amount of lost motion therebetween. The first and second slides are connected by a slide rod which permits the two slides to move with respect to one another but limits the maximum separation therebetween. The first slide coacts with a first pair of microswitches, one of which functions as the down limit switch for shutting off the motor when the door reaches its fully closed position and the other of which functions as a down cut-off switch for deactivating the safety switch when the door is a preselected distance from its fully closed position. The second slide coacts with a second pair of microswitches which includes an uplimit switch for shutting off the motor when the door is in its fully open position and an up cut-off switch which deactivates the safety switch when the door is within a preselected distance from its fully opened position.

DETAILED DESCRIPTION

Figure 2:
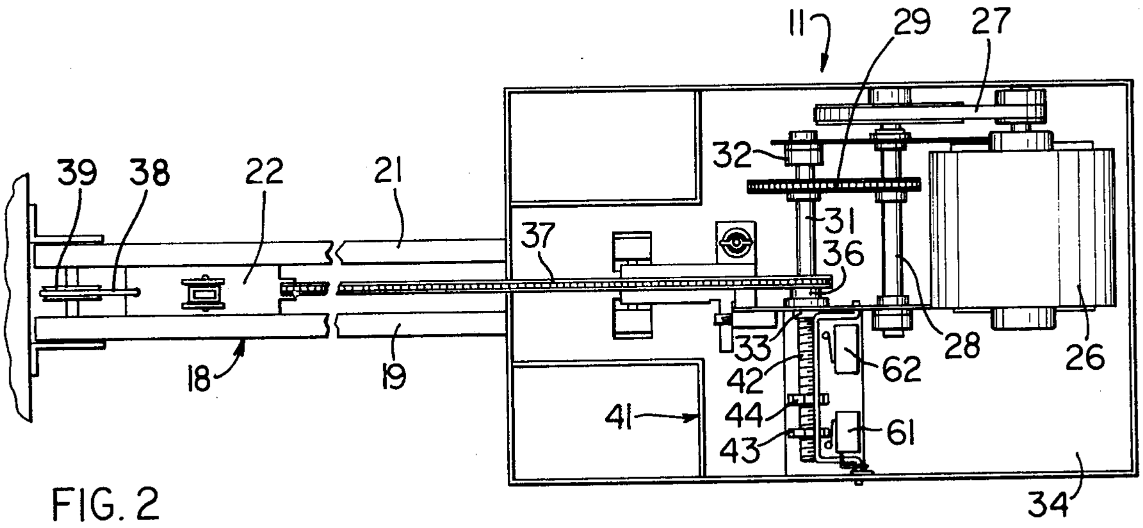
FIG. 2 is a bottom view of the structure as appearing in FIG. 1, same being taken substantially along line II—II in FIG. 1.
Figure 4:
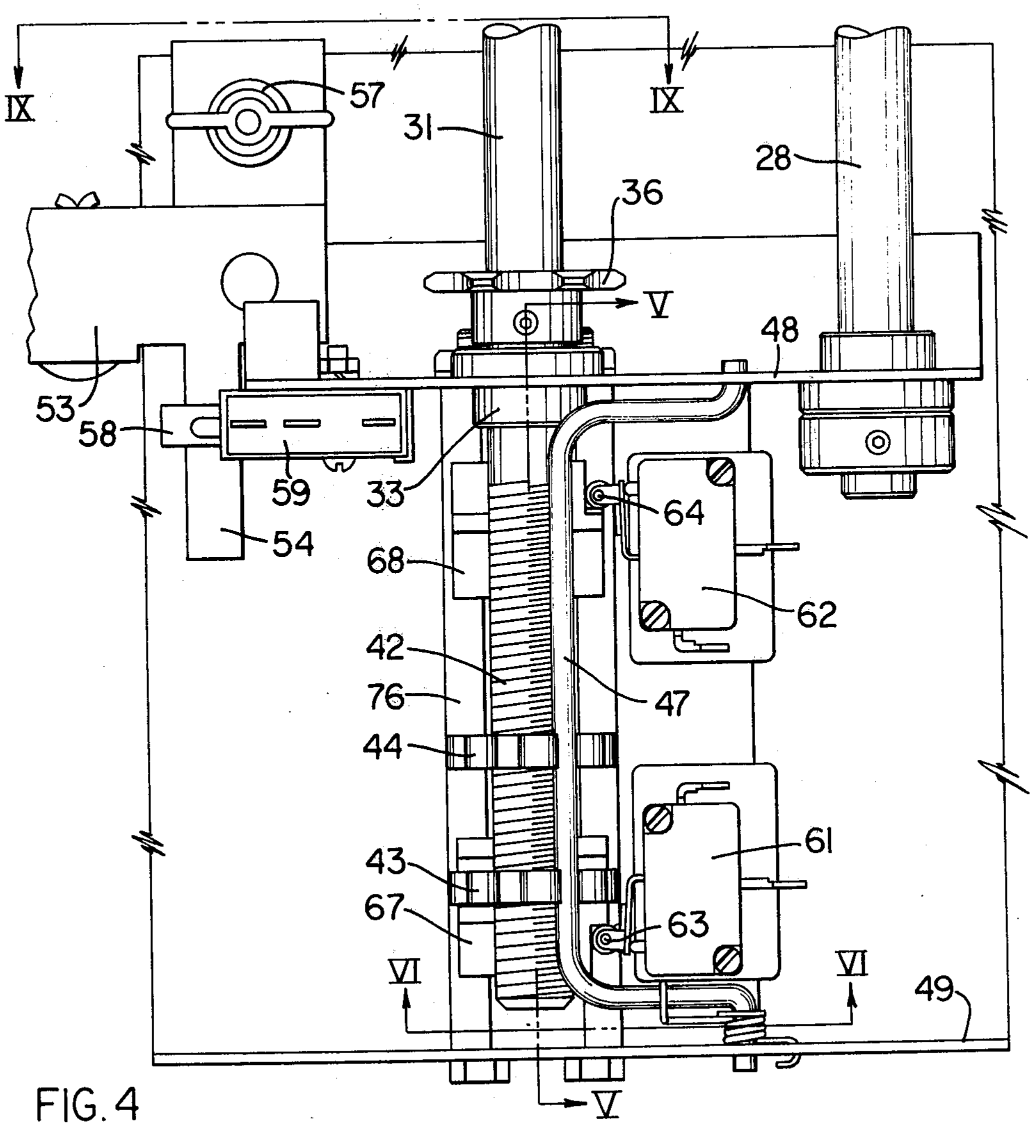
FIG. 4 is an enlargement of the switch mechanism of FIG. 2.

FIGS. 1 and 2 illustrate therein a motor driven door operator 11 which may be manually or remotely controlled for opening and closing an upwardly acting door 12. One such door, which is designed for covering an opening 13 defined above a floor 14, is comprised of several horizontally hinged sections having rollers 16 mounted thereon for engagement with side rails 17 for guiding the movement of the door between a substantially vertical closed position and a substantially horizontal open position. However, the invention can be readily adapted to other types of doors and other patterns of door movement.

The operator 11 includes an elongated horizontal beam 18 defined by a pair of guide rails 19 and 21 between which a carriage 22 is supported for movement lengthwise thereof. The carriage 22 is pivotally connected to the upper end of an arm 23, which arm at its lower end is connected to the door 12 by means of an intermediate spring box 24.

To permit movement of the carriage 22, the operator 11 includes a reversible electric motor 26 which is drivingly connected by an intermediate belt 27 to an intermediate shaft 28, which in turn is drivingly connected by a chain drive 29 to a main drive shaft 31. The shaft 31 is rotatably supported by bearings 32 and 33 on a housing 34 which is fixed with respect to the stationary beam 18. A driving sprocket 36 is fixed to the shaft 31 and is engaged with an elongated chain 37 which is connected at its opposite ends to the opposite ends of a cable 38, which cable extends around a pulley 39 rotatably supported upon the front end of the beam. Two corresponding ends of the chain 37 and cable 38 are interconnected by mutual engagement with the shuttle 22, as shown in FIG. 2. Accordingly, as the chain and cable are moved around the sprocket 36 and pulley 39, respectively, the carriage 22 is moved lengthwise of the guide rails 19 and 21, whereby the door 12 is moved in either an opening or closing direction. The lengths of the chain 37 and cable 38 are selected so that the chain is always in engagement with the sprocket 36 and the cable is always in engagement with the pulley 39 throughout the full extent of linear movement of carriage 22.

To control energization of reversible motor 26, the operator 11 includes a switch mechanism 41 associated therewith, which switch mechanism includes a threaded control shaft 42 which comprises an extension of the main drive shaft 31. Shaft 42 threadably supports a pair of traveling nuts 43 and 44 which have a plurality of closely spaced slots 46 in the peripheral portions thereof. A U-shaped timing bar 47 is pivotally supported on and extends between the sidewalls 48 and 49 of the housing, and is resiliently urged by spring 51 into a pair of aligned slots 46 as formed in the nuts 43 and 44 for preventing rotation of the nuts. Rotation of shafts 31 and 42 thus causes the nuts 43 and 44 to move lengthwise of the shaft.

Figure 9:
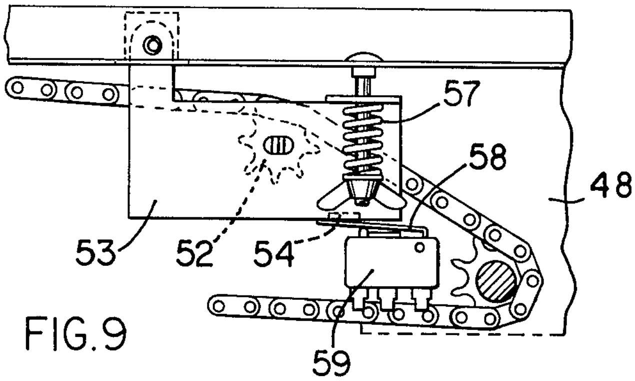
FIG. 9 is a fragmentary sectional view taken along line IX—IX in FIG. 4.

As shown in FIG. 9, the chain 37 engages an idler sprocket 52 supported by a bracket 53 having a safety switch actuating plate 54. Bracket 53 is pivotally mounted on the beam 18 adjacent the switch mechanism 41 for movement around an axis parallel with the drive shaft 31. The bracket 53 is normally urged against a portion of the beam by means of a spring 57. The bracket 53, when urged in opposition to the spring 57 due to an increase in the drive force being transmitted through the chain, causes the plate 54 to engage a switch actuator 58 associated with a normally open safety switch 59 for closing same. Thus, when the door is being moved in a downward direction and strikes an obstruction which interferes with further downward movement, the chain cannot continue to move around the drive sprocket 36, whereby the tension applied by drive sprocket 36 to chain 37 tends to straighten out the bend in the chain where it passes around the idler sprocket 52, so that bracket 53 is swung outwardly against the urging of spring 57. The plate 54 thus engages the switch actuator 58 and causes the safety switch 59 to be closed, thus causing reversal in the rotational direction of motor 26.

The above described structure substantially corresponds to the operator disclosed in U.S. Pat. No. 3,474,317, whereby further description of same is not believed necessary.

In the present invention, the switch mechanism 41 additionally includes a first pair of normally closed microswitches 61 and 62 having actuators 63 and 64, respectively, associated therewith. Switch 61 functions as an "up" limit switch, whereas switch 62 functions as a "down" limit switch.

The limit switches 61 and 62 are controlled by a floating slide assembly 66 which includes first and second sliders 67 and 68 positioned for engagement with the up and down limit switches 61 and 62, respectively. The slide assembly 66 also coacts with a second pair of normally closed microswitches 71 and 72 which are positioned directly beneath the limit switches 61 and 62, respectively. The limit switch 71, which will be referred to as the up cut-out switch, has a switch actuator 73 positioned for engagement with the slider 67. In a similar manner, the switch 72, which will be referred to as the down cut-out switch, has an actuator 74 positioned for engagement with the slider 68.

Figure 6:
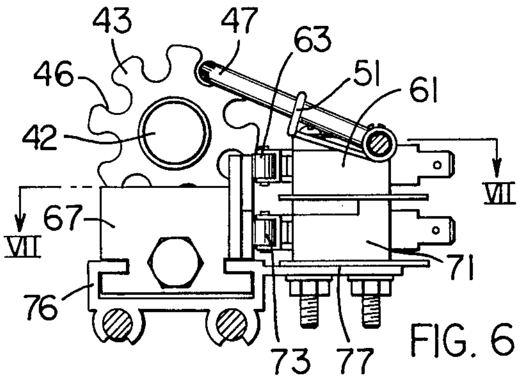
FIG. 6 is a sectional view taken along line VI—VI in FIG. 4.

The sliders 67 and 68 are each slidably supported on an elongated rail 76 which is of a substantially channel-shaped cross-section and extends between and is fixedly mounted on the sidewalls 48 and 49. The rail 76, as illustrated in FIG. 6, has opposed inwardly directed flanges which are slidably accommodated within narrow slots formed in the opposite sides of the sliders 67 and 68 so as to confine the sliders for slidable movement longitudinally of the rail 76. The rail 76 also has a flange 77 fixed thereto and projecting sidewardly therefrom, which flange has the pairs of switches 61–62 and 71–72 stationarily mounted thereon. The sliders 67 and 68 are also connected together by an elongated rod 78, such as a bolt, which rod slidably extends through each of the sliders 67 and 68 and has an enlarged head 79 on one end thereof and a nut 81 on the other end thereof. Rod 78 permits each slider 67 or 68 to be individually slidably displaced therealong, while at the same time the rod 78 limits the maximum spacing between the sliders.

Figure 8:
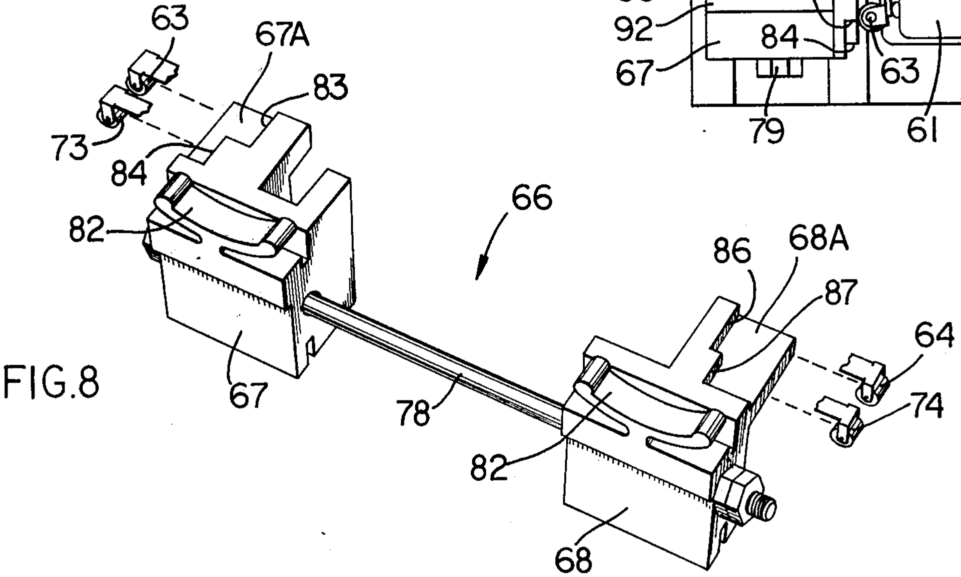
FIG. 8 is a perspective view of the slide assembly.

As illustrated in FIG. 8, each of the sliders 67 and 68 has a leaf spring 82 associated therewith, which spring coacts between the respective slider and the bottom wall of the rail 76 to create a frictional holding force which prevents undesired displacement of the individual sliders along the rail. While the springs 82 may comprise individual leaf springs if desired, they are each preferably formed integrally with the respective sliders, as by being molded from nylon or other suitable plastic materials.

To permit actuation of the microswitches, slider 67 is provided with a pair of cams 83 and 84 positioned to respectively engage the actuators 63 and 73 as associated with the switches 61 and 72, respectively. Slider 68 similarly has cams 86 and 87 positioned to respectively engage the switch actuators 64 and 74 associated with the switches 62 and 72. The cams 83 and 84 associated with the slider 67, and the cams 86 and 87 associated with the slider 68, are offset from one another in the direction of slider movement so that cams 83 and 86 are positioned inwardly and spaced a smaller distance apart than the cams 84 and 87. The sliders 67 and 68 also have suitable support walls 67A and 68A, respectively, formed thereon and projecting outwardly beyond the cams as illustrated in FIG. 8.

Figure 5:
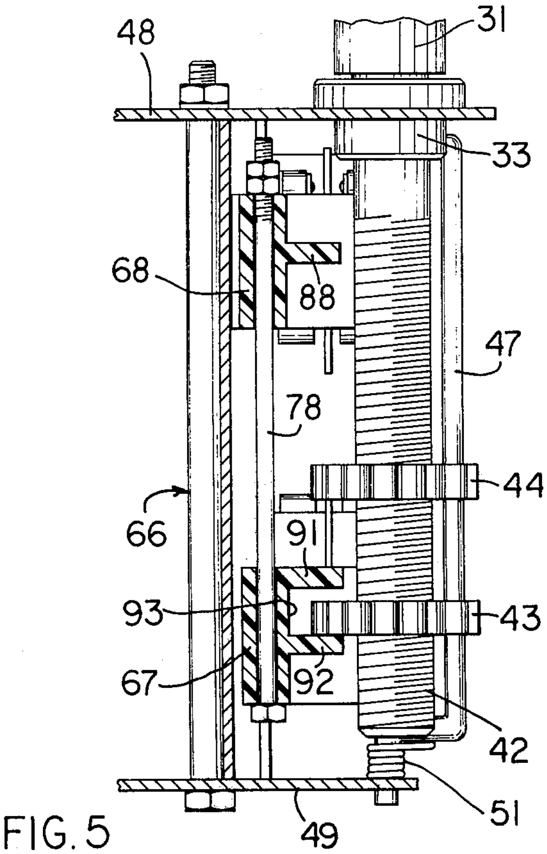
FIG. 5 is a fragmentary sectional view taken along line V—V in FIG. 4.

The liner displacement of sliders 67 and 68 along the rail 76 is controlled by the traveling nuts 43 and 44, respectively. For this purpose, the slider 68 has a wall 88 formed thereon and projecting outwardly in a direction substantially transverse to the direction of movement. The wall 88 projects upwardly a sufficient extent so as to lie within the path of movement of the traveling nut 44, whereupon the traveling nut 44 will abut the wall 88 when the nut 44 approaches an endmost position which corresponds to the door being in a closed position. The other slider 67 has a pair of walls 91 and 92 formed thereon and projecting outwardly therefrom in a direction substantially transverse to the direction of slider movement. The walls 91 and 92 project outwardly a sufficient extent so as to be positioned for abutting engagement with the traveling nut 43, and define therebetween a slot 93 into which projects a portion of the nut 43. However, as illustrated in FIG. 5, the slot 93 has a width which is substantially greater than the thickness of the nut 43 for a purpose to be explained hereinafter.

Figure 10:
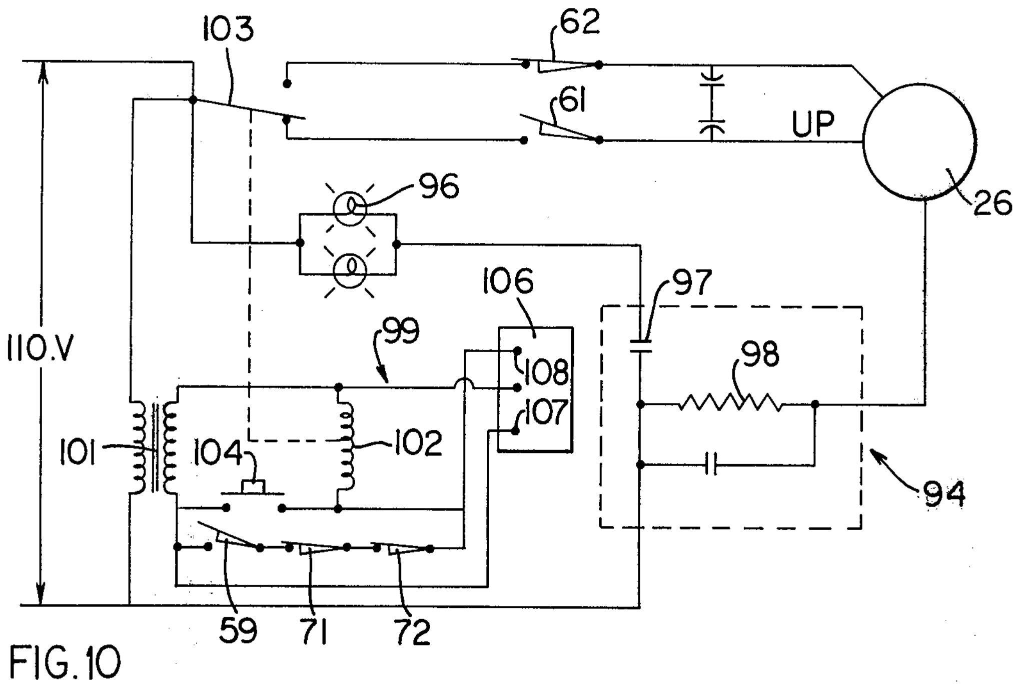
FIG. 10 is a diagrammatic sketch of the circuitry associated with the switch mechanism of the invention.

Referring now to FIG. 10, same diagrammatically illustrates therein an electrical circuit 94 for the operator of the present invention. The circuit 94 includes the reversible electric motor 26 which is adapted to be energized from a conventional 110-volt source. Motor 26 is connected to two parallel paths which contain the up and down limit switches 61 and 62, respectively. Motor 26 is also connected in series with a heater coil 98 which, when energized, causes closure of the normally-open delay contact 97 so that lights 96 will be energized during the opening and closing movement of the door. The contact 97 also remains closed for a preselected time after the motor 26 is deenergized.

To permit selection in the direction of motor rotation and to permit activation of the overall circuit, same includes a start circuit 99 which is connected to the potential source by means of an intermediate transformer 101. The start circuit contains therein a conventional relay coil 102 which in turn controls a double throw relay switch 103 in a conventional manner, whereby sequential energization of coil 102 results in relay switch 103 being alternately connected to the up and down limit switches 61 and 62. A manually controlled start button 104, which in a conventional manner is normally maintained in an open position, is also connected in series with the coil 102 so that the coil can be energized whenever the start button 104 is manually depressed. Coil 102 is also connected in series with a further circuit branch which contains therein the normally closed cutout switches 71 and 72 and the normally open safety switch 59. These latter switches, which are all connected in series, are disposed in a circuit branch which is in parallel with the manual push button 104. Coil 102 can also be energized in a conventional manner from a remote control, such as a conventional radio frequency control panel, and for this purpose start circuit 99 includes a radio frequency receiver 106 which includes contacts 107 and 108 therein, which contacts are electrically connected upon receipt of an appropriate signal so as to permit energization of coil 102.

OPERATION

Figure 7:
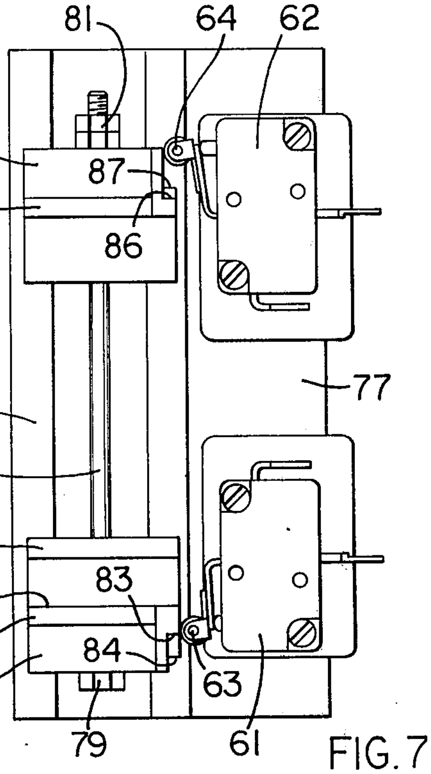
FIG. 7 illustrates a portion of the switch mechanism except that the screw and traveling nuts have been eliminated for purposes of illustration.
Figure 11:
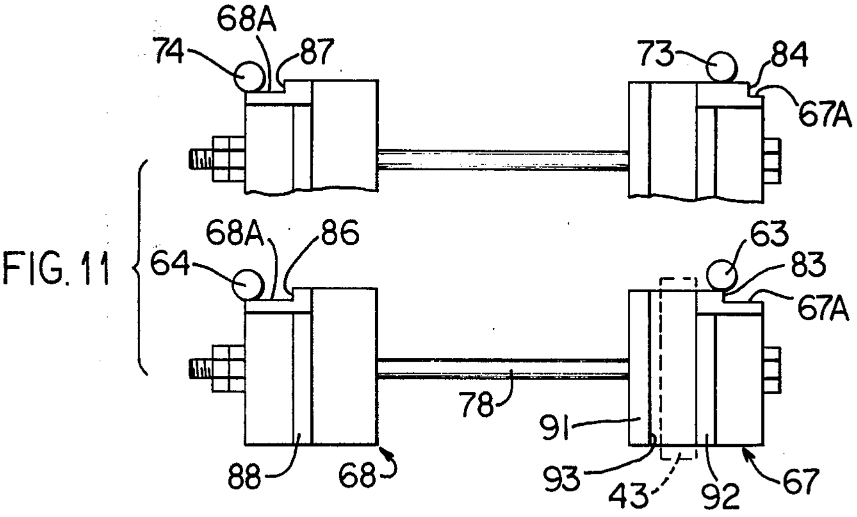
FIG. 11 illustrates the manner in which the sliders coact with the limit and cut-out switches.

Before considering the operation of operator 11, it will be assumed that the door is initially in its upper opened position substantially as illustrated in FIGS. 3–7 and 11. When in this uppermost or open position, the sliders 67 and 68 are maintained at their maximum spacing adjacent the opposite ends of the rod 78, and the nuts 43 and 44 are both positioned adjacent the free end of the threaded control shaft 42 with the nut 43 abutting the slider wall 92, as shown in FIG. 5. The slider 67 when so positioned results in the switch actuators 63 and 73 being engaged with the cams 83 and 84, respectively, as illustrated in FIGS. 7 and 11, whereby switches 61 and 71 are maintained in open positions. At the same time, the slider 68 is positioned slightly inwardly from its endmost position so that, as illustrated in FIG. 11, the switch actuators 64 and 74 are engaged with the bearing surface 68A whereby the switches 62 and 72 are in their normally closed positions. The safety switch 59 is also in its normal open position and the relay switch 103 is connected in series with the up limit switch 61 (which is now open), as illustrated in FIG. 10.

When closing of the door is desired, then button 104 is manually depressed or a suitable radio signal is supplied to receiver 106 so that coil 102 is momentarily energized, thereby causing relay switch 103 to shift into series connection with the closed down limit switch 62, whereby motor 26 is energized in a direction suitable to cause movement in the door closing direction. The energization of motor 26 causes rotation of threaded control shaft 42 whereby the traveling nuts 43 and 44 are moved upwardly along the shaft as illustrated in FIG. 5. Due to the lost motion connection provided between the nut 43 and the slider walls 91 and 92, the nut 43 moves upwardly through a small distance until coming into contact with the slider wall 91, which lost motion permits a limited amount of door movement away from its fully open position, which amount may be in the order of approximately 6 inches of door travel depending upon the magnitude of lost motion between nut 43 and slider 67. This lost motion connection and the permissible door travel permitted thereby is desirable since it prevents the door from receiving another signal after it has been opened, should the door coast back down due to wear or slight misadjustment of the springs, which would otherwise cause the door to undergo a "yo-yo" or oscillating motion.

After this lost motion is taken up, whereby nut 43 contacts slider wall 91, slider 67 is then slidably displaced along the rod 78 due to continued upwardly movement of nut 43 as caused by rotation of shaft 42. When slider 67 is displaced upwardly a small distance by nut 43, then actuator 63 drops off of the cam 83 onto the surface 67A, whereby up limit switch 61 returns to its normally closed position. After closing of switch 61, the slider 67 is still further moved upwardly by the nut 43 whereby after a further preselected displacement of the slider 67, the switch actuator 73 falls off of the cam 84 and engages the surface 67A, whereby cut-out switch 71 is accordingly returned to its normally closed position. This additional displacement required to close switch 71 after closure of switch 61 will normally amount to an additional door travel of approximately six inches. However, during this initial travel of the door away from its fully open position, the holding open of the up cut-out switch 71 allows the operator to overcome the force required to start the door moving in its closing direction, which force would normally be sufficient to cause closure of the safety switch 59 but, in this situation, the closure of the safety switch 59 is immaterial since it is connected in series with the cut-out switch 71 which is maintained open during at least approximately the first 12 inches of door closing travel.

After the door has moved in its closing direction a sufficient extent to result in closing of the up cut-out switch 71, the door will continuously move towards its closed position and, during this time, the slider 67 will be moved upwardly in FIG. 5) by the nut 43, whereas the slider 68 will remain stationary with respect to the rail 76 due to the frictional holding force developed by its spring 82. If the door should encounter an obstruction which prevents further closing movement of the door, then this results in the force transmitted through the chain being substantially increased and causes displacement of bracket 53 in opposition to the urging of spring 57, whereby safety switch 59 is momentarily closed. Since the cut-out switches 71 and 72 are already closed, this results in momentary energization of the coil 102 so that relay switch 102 flips over into engagement with the already closed down limit switch 62. Motor 26 is thus energized to rotate in the reverse direction, thereby moving the door upwardly in an opening direction.

On the other hand, if the door does not encounter an obstruction during its closing movement, then as the door approaches its fully closed position, the traveling nut 44 engages the wall 88 of slider 68. After a small displacement of slider 68 in the upwardly direction in FIG. 5, the cam 87 causes switch actuator 74 to be cammed outwardly whereby down cut-out switch 72 is moved into an open position when the lower edge of the door is spaced a small distance above the threshold 14, which distance may be in the order of approximately 2 inches. This opening of the cut-out switch 72 thus overrides the safety switch 59 due to the series connection therebetween, so that the motor cannot be reversed when the door is adjacent its fully closed position. The motor continues to move the door downwardly and continues upward movement of slider 68 until switch actuator 64 engages cam 86 and activates down limit switch 62 into an opened position, which results in immediate deenergization of motor 26 and stoppage of the door in its fully closed position wherein the lower edge of the door is substantially in engagement with the threshold 44.

When the door, during its closing movement, reaches the position wherein the down cut-out switch 72 is deactivated (which position may occur when the lower edge of the door is about two inches above the threshold), the top section of the door is almost vertical at this point and the carriage 22 is moving the arm 23 through an overcenter position. Accordingly, if the door should encounter an obstruction during the last two inches of travel (after opening of the cut-out switch 72), which obstruction may constitute mud, ice or the like, then the motor 26 will continue to drive the carriage 22 and likewise the slider 68 until it engages and opens the down limit switch 62. However, since the door is prevented from moving downwardly during this latter phase, the movement of the carriage 22 and specifically the arm 23 will be absorbed by the spring box 24 inasmuch as the actual downward movement during this phase is relatively small. Thus, the operator will still operate until it reaches and activates the down limit switch so as to shut off the operator. This thus allows the door to remain closed and also allows the motor to shut off, and an undesired reversing or opening of the door is thus avoided.

When the door is in its down or closed position as described above, the down limit switch 62 and the down cut-out switch 72 are both open, whereas the up limit switch 61 and the up cut-out switch 71 are both closed. If it is desired to open the door, the relay coil 102 is again energized either due to depression of push button 104 or receipt of a radio signal from a remote operator. Relay switch 103 is thus shifted so as to be again connected in series with the closed up limit switch 61, and motor 26 is thus energized in a direction causing an opening movement of the door. This energization of motor 26 causes the control shaft 42 to rotate in a reverse direction so that nuts 43 and 44 now travel downwardly in FIG. 5. During the initial downwardly movement of the door, the nut 44 moves away from the slider wall 88, and the slider 68 remains stationary due to the frictional holding force created by its respective spring 82. The other nut 43 also moves across the slot 93 and engages the wall 92, whereby slider 67 is thus moved downwardly along the rail 76. If, during this upward or opening movement of the door, the push button 104 or the remote radio is again activated so as to cause energization of the coil 102, which in turn causes a shifting of relay switch 103 so that same is connected in series with the down limit switch 62, then the motor 26 will be energized and the door stopped (and not reversed) since the down limit switch 62 is still being held in its open position by the slider 68. Thus, an accidental or deliberate activation of coil 102 during the opening movement of the door will merely result in a stoppage of the door at a location disposed between the fully open and fully closed positions. A still further energization of the coil 102 will again cause switch 103 to shift into a series connection with the closed up limit switch 61 so that the upward opening movement of the door will then continue.

As the door approaches its fully open position, the slider 67 first contacts the actuator 73 whereby up cut-out switch 71 is opened and then contacts actuator 63 whereby up limit switch 61 is opened, thereby deenergizing motor 26 so that the door is stopped in a fully opened position. However, just before slider 67 engages the actuator 63, the slider 67 will be spaced from the slider 68 by the maximum spacing permitted between the bolt head 79 and the nut 81. Thus, during the last portion of downward travel of the slider 67, the slider 68 will also be pulled downwardly due to the connection provided by the intermediate rod 78. Slider 68 is thus moved downwardly a sufficient distance to cause both of the followers 64 and 74 to move into engagement with surface 68A so that down limit switch 62 and down cut-out switch 72 both return to their normal closed positions. Thus, the complete system is accordingly returned to its original position and is ready for initiation of the next closing cycle.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a device including a reversible electrical motor connectible to a source of electrical potential for opening and closing a door connected to the motor by drive means, the motor being rotatable in a first direction when the door is being moved toward a first end position wherein it is closed, the motor being rotatable in a second direction opposite said first direction when the door is being moved toward a second end position wherein the door is open, and a mechanism for controlling the motor rotation, said mechanism comprising:

first circuitry means including a first normally-closed switch for connecting the motor in series with the source of potential for rotating the motor in said first direction;

first means responsive to movement in said first direction for opening said first switch as said door moves into said first end position;

second circuitry means including a second normally-closed switch for connecting the motor in series with the source of potential for rotating the motor in said second direction;

second means responsive to movement in said second direction for opening said second switch as said door moves into said second end position;

relay means alternately connecting said source to one of said first and second circuitry means;

third circuitry means connected to said source for operating said relay means, said third circuitry means including normally-open activating switch means for permitting selective actuation of said relay means to permit said door to be selectively moved between its open and closed position;

said third circuitry means further including normally-open safety switch means connected in parallel with said activating switch means for operating said relay means independently of said activating switch means for permitting control of said motor during movement in said first direction;

first override means for overriding said safety switch means to prevent reversing of said motor when the door is moving in said first direction and is within a first preselected distance from said first end position, said first override means including a third normally-closed switch connected in series with said safety switch means and a first actuator for moving said third switch into its open position when the door is moving in said first direction and is spaced said first predetermined distance from said first end position; and second override means for overriding said safety switch means to prevent reversing of said motor when said door is within a second predetermined distance from said second end position, said second override means including a fourth normally-closed switch connected in series with said safety switch means and said third switch, and a second actuator for moving said fourth switch into its open position when said door is moving in said second direction and is spaced said second predetermined distance from said second end position.

2. A device according to claim 1, wherein said first actuator comprises a first slider having first and second cams thereon positioned for respectively engaging said first and third switches, and said second actuator comprising a second slider having third and fourth cams thereon positioned for engaging said second and fourth switches.

3. A device according to claim 2, further including guide means for slidably mounting said first and second sliders for movement in substantially parallel directions and connecting means interconnecting said first and second sliders for permitting relative slidable movement therebetween while limiting the separation distance between said sliders in the direction of movement thereof.

4. A device according to claim 3, including a rotatable threaded shaft drivingly interconnected to and rotated by said motor, a pair of travelling nuts threadably engaged on said shaft and means coacting with said nuts for preventing rotation thereof whereby said nuts are constrained to move axially along said shaft in response to rotation thereof, said first and second nuts respectively coacting with said first and second sliders for slidably displacing same.

5. A device according to claim 4, wherein said first and second sliders and said interconnecting means are in their entirety mounted for slidable displacement.

6. A power unit for controlling the movement of a door between a first end position wherein the door is closed and a second end position wherein the door is open, the power unit including drive means rotatable in a first direction for causing movement of said door in a closing direction toward said first end position and rotatable in a second direction opposite said first direction for causing movement of said door in an opening direction towards said second end position, comprising the improvement wherein said power unit includes:

reversing means coacting with said drive means for causing the rotation thereof, when said door is being moved in said closing direction, to be automatically reversed whenever the door strikes an obstruction which restricts movement of said door, whereby said door is automatically returned to said second end position;

said reversing means including a normally-open safety switch and means for causing closure of said safety switch when said door strikes an obstruction;

first override means coacting with said safety switch for preventing reversal in the rotation of said drive means when the door is moving in said closing direction and is spaced within a first predetermined distance from said first end position, said first override means including a first normally-closed cutout switch electrically connected in series with said safety switch;

second override means coacting with said safety switch for preventing reversal in the rotation of said drive means when said door is moving in said closing direction and is spaced within a second predetermined distance from said second end position, said second override means including a second normally-closed cut-out switch electrically connected in series with said safety switch; and actuating means responsive to the movement of said door in said closing direction for causing the first and second cut-out switches to be individually moved to their open positions when the door is disposed within said first and second predetermined distances, respectively.

7. A power unit according to claim 6, wherein said actuating means includes first and second sliders slidably mounted on a stationary frame and slidably movable with respect to said frame and with respect to one another, said first and second sliders respectively coacting with said first and second cut-out switches for activating same into their respective open positions.

8. A power unit according to claim 7, further including connecting means extending between and interconnecting said first and second sliders for limiting the separation distance between said sliders to a preselected amount, said connecting means permitting relative slidable movement between said first and second sliders so long as said separation distance does not exceed said preselected amount, said connecting means causing said first and second sliders to move in unison when they are spaced apart by said preselected amount.

9. A power unit according to claim 8, wherein said drive means includes a drive shaft which is rotatable in said first and second direction and a threaded control shaft drivingly connected to said drive shaft so as to be rotatable in opposite directions, and a pair of nuts threadably engaged with said control shaft and restrained from rotation so that said nuts travel axially of said control shaft upon rotation thereof, said first and second nuts respectively coacting with said first and second sliders for slidably displacing same.

10. A power unit according to claim 9, wherein said drive means includes a reversible electric motor, first and second normally-closed limit switches connected in series with said motor, said first and second limit switches being respectively activated into their open positions by said first and second sliders.

11. A power unit according to claim 8, wherein said drive means includes a reversible electric motor, first and second normally-closed limit switches connected in series with said motor and being individually movable into open positions when said door is in said first and second end positions respectively, said first slider having first and second cams thereon and positioned to respectively actuate said first cut-out switch and said first limit switch in a timed sequence, and said second slider having first and second cams thereon disposed to respectively actuate said second cut-out switch and said second limit switch in timed sequence.

12. In an operating device including reversible drive means for opening and closing a door, the reversible drive means including an electric motor connectible to a source of electric potential, the drive means being rotatable in a first direction when said door is being moved toward a first end position wherein it is closed, and the drive means being rotatable in a second direction opposite said first direction when the door is being moved toward a second end position wherein the door is opened, and a mechanism for controlling the rotation of said drive means, said mechanism comprising:

frame means;

threaded control shaft means rotatably supported on said frame means and drivingly connected to said drive means, the rotational direction of said control shaft means being dependent upon the rotational direction of said drive means;

nut means threadably engaged on said control shaft means and means coacting with said nut means for restraining rotation thereof, whereby said nut means travels axially along said control shaft means upon rotation thereof;

a slide assembly supported on said frame means adjacent said control shaft means for slidable movement in a direction substantially parallel to the rotational axis of said control shaft means;

first switch means disposed adjacent one end of said slide assembly and activated thereby for controlling said drive means when said door is at or adjacent said first end position;

second switch means disposed adjacent the other end of said slide assembly and activated thereby for controlling said drive means when said door is at or adjacent said second end position; and said slide assembly including first and second sliders which are each slidable with respect to said frame means and are also slidable with respect to one another, said first and second sliders being positioned to respectively engage said first and second switch means, and the motion of said first and second sliders being controlled by said nut means.

13. In a device according to claim 12, wherein said nut means includes first and second spaced nuts threadably engaged with said control shaft means, said second nut coacting with said second slider and being coupled thereto by a lost motion connection which permits only a limited amount of axial displacement of said second nut relative to said second slider, and said first nut coacting with said first slider for slidably displacing same.

14. In a device according to claim 13, wherein said first switch means includes a first pair of switches which are sequentially actuated by said first slider when said door approaches said first end position, and wherein said second switch means includes a second pair of switches which are sequentially actuated by said second slider when said door approaches said second end position.

15. In a device according to claim 13, wherein said slide assembly includes an elongated rod means connected between and slidably supported on said first and second sliders so that said rod means is slidably movable with respect to said frame means and each of said sliders, said rod means having means associated therewith and coacting with said first and second sliders for limiting the maximum separation distance between said first and second sliders.

16. A device according to claim 3, wherein said interconnecting means comprises an elongated rod which extends between and is slidably supported on said first and second sliders so that said rod and said first and second sliders are all slidable relative to one another and relative to a stationary housing.

17. A power unit according to claim 9, wherein each of said first and second sliders have cam means thereon disposed for coacting with and actuating said first and second cut-out switches respectively, and means defining a lost-motion connection between one of said nuts and its respective slider for permitting only a limited amount of relative axial displacement therebetween.

* * * * *